US008908555B2

(12) United States Patent
Bachl et al.

(10) Patent No.: US 8,908,555 B2
(45) Date of Patent: Dec. 9, 2014

(54) TECHNIQUE FOR CHANNEL ESTIMATION IN THE PRESENCE OF A SIGNAL PHASE DISCONTINUITY

(75) Inventors: Rainer Bachl, Nürnberg (DE); Stefan Mueller-Weinfurtner, Nürnberg (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 93 days.

(21) Appl. No.: 13/823,501

(22) PCT Filed: Sep. 27, 2010

(86) PCT No.: PCT/EP2010/005893
§ 371 (c)(1),
(2), (4) Date: Mar. 14, 2013

(87) PCT Pub. No.: WO2012/041337
PCT Pub. Date: Apr. 5, 2012

(65) Prior Publication Data
US 2013/0182599 A1   Jul. 18, 2013

(51) Int. Cl.
| H04B 1/06 | (2006.01) |
| H04W 52/02 | (2009.01) |
| H04L 25/02 | (2006.01) |
| H04L 27/26 | (2006.01) |

(52) U.S. Cl.
CPC ...... *H04W 52/0209* (2013.01); *H04W 52/0229* (2013.01); *H04L 25/0202* (2013.01); *H04L 25/022* (2013.01); *H04L 27/2647* (2013.01); *H04L 25/0232* (2013.01)
USPC ............................ 370/252; 370/350; 375/346

(58) Field of Classification Search
None
See application file for complete search history.

(56) References Cited

U.S. PATENT DOCUMENTS

| 7,133,437 B2 * | 11/2006 | Black et al. ................... 375/149 |
| 8,165,008 B2 * | 4/2012 | Ridel et al. .................... 370/204 |
| 2009/0016252 A1 | 1/2009 | Ho et al. |

FOREIGN PATENT DOCUMENTS

EP       1826971 A1      8/2007

OTHER PUBLICATIONS

Kim, J. et al., "Enhanced Channel Estimation for Comb-type Pilot-aided OFDM systems", Conference Publication, 2005 IEEE 16th International Symposium on Personal, Indoor and Mobile Radio Communications, Berlin, Germany, Sep. 11, 2005, pp. 2481-2483, vol. 4, XP 10928137, IEEE, USA.
Frank, T. et al., "An Efficient Implementation for Block-IFDMA", Conference Publication, The 18th Annual IEEE International Symposium on Personal, Indoor and Mobile Radio Communications, (RIMRC'07), Athens, Greece, Sep. 3, 2007, pp. 1-5, XP 31168745, IEEE, USA.

* cited by examiner

*Primary Examiner* — Alex Skripnikov
(74) *Attorney, Agent, or Firm* — Coats & Bennett, PLLC (57) ABSTRACT

A technique for performing channel estimation based on a received signal comprising a first signal part and a second signal part in the presence of an unknown phase discontinuity between the first signal part and the second signal part is presented. A method implementation of this technique comprises providing a first channel parameter that is based on the first signal part, determining a second channel parameter based on the second signal part, estimating the phase discontinuity from the first channel parameter and the second channel parameter, updating the first channel parameter based on the estimated phase discontinuity, and determining a channel estimate based on the second signal part including performing channel estimation filtering using the updated first channel parameter as filter state information.

18 Claims, 6 Drawing Sheets

TECHNIQUE FOR CHANNEL ESTIMATION IN THE PRESENCE OF A SIGNAL PHASE DISCONTINUITY

TECHNICAL FIELD

The present disclosure generally relates to channel estimation. In particular, a channel estimation technique is disclosed that can cope with a signal phase discontinuity between a first signal portion and a second signal portion.

BACKGROUND

It is generally desirable to reduce power consumption of electronic devices having receiving functionalities. Especially battery-operated mobile terminals benefit from a reduced receiver power consumption. The benefits include longer stand-by and operational times.

Mobile terminals usually conform to one or more mobile communication standards that define, inter alia, operational states for the receiver. As an example, the Long Term Evolution (LTE) standard of the 3$^{rd}$ Generation Partnership Project (3GPP) specifies so-called "idle" and "connected" states for the physical layer of a mobile terminal (also referred to as User Equipment, or UE, in the LTE standard). The physical layer includes receiver components, the operation of which is influenced by the current state setting.

When the UE is in idle state, there are no ongoing transfers in the receiving and transmitting directions. The UE is only waking-up from time to time to check whether a connection request is coming in. An incoming connection request is signalled at so-called paging occasions. In idle state, the power consumption is therefore heavily reduced because the receiver components are switched off most of the time and only briefly switched on at paging occasions.

In connected state, the receiver components are switched on most of the time as the UE has to listen to the Physical Downlink Control Channel (PDCCH), which is transmitted in a first portion of a sub-frame. The PDCCH is used to transfer scheduling grants indicating that there will be a transmission on the Physical Downlink Shared Channel (PDSCH) to the UE in a subsequent second portion of the current sub-frame. In case a PDSCH transmission is indicated to the UE (either in the PDCCH or by semi-persistent scheduling), the remainder of the sub-frame has to be received and the PDSCH has to be decoded. Reception must also continue in other scenarios such as intra-frequency measurements or Broadcast Channel (BCH) readings.

There are still many scenarios in connected state in which decoding of the first sub-frame portion reveals that the remainder of the sub-frame following the PDCCH is of no interest to the UE and in which reception can be terminated until the next sub-frame arrives. Terminating reception by switching off one or more receiver components during the resulting short gap between the end of the first portion of one sub-frame and the beginning of the next sub-frame is also referred to as micro sleep.

In the LTE standard, a sub-frame has a duration of 1 ms and downlink transmissions are based on Orthogonal Frequency Division Multiplexing (OFDM). OFDM-based systems use block processing that includes a Fast Fourier Transform (FFT) for OFDM de-modulation. The digital receiver domain (Digital Front End, or DFE) before the FFT is based on sample processing. The PDCCH can be spread over up to 4 OFDM symbols for a system bandwidth of 1.4 MHz and over up to 3 OFDM symbols for larger bandwidths.

Figure 1:
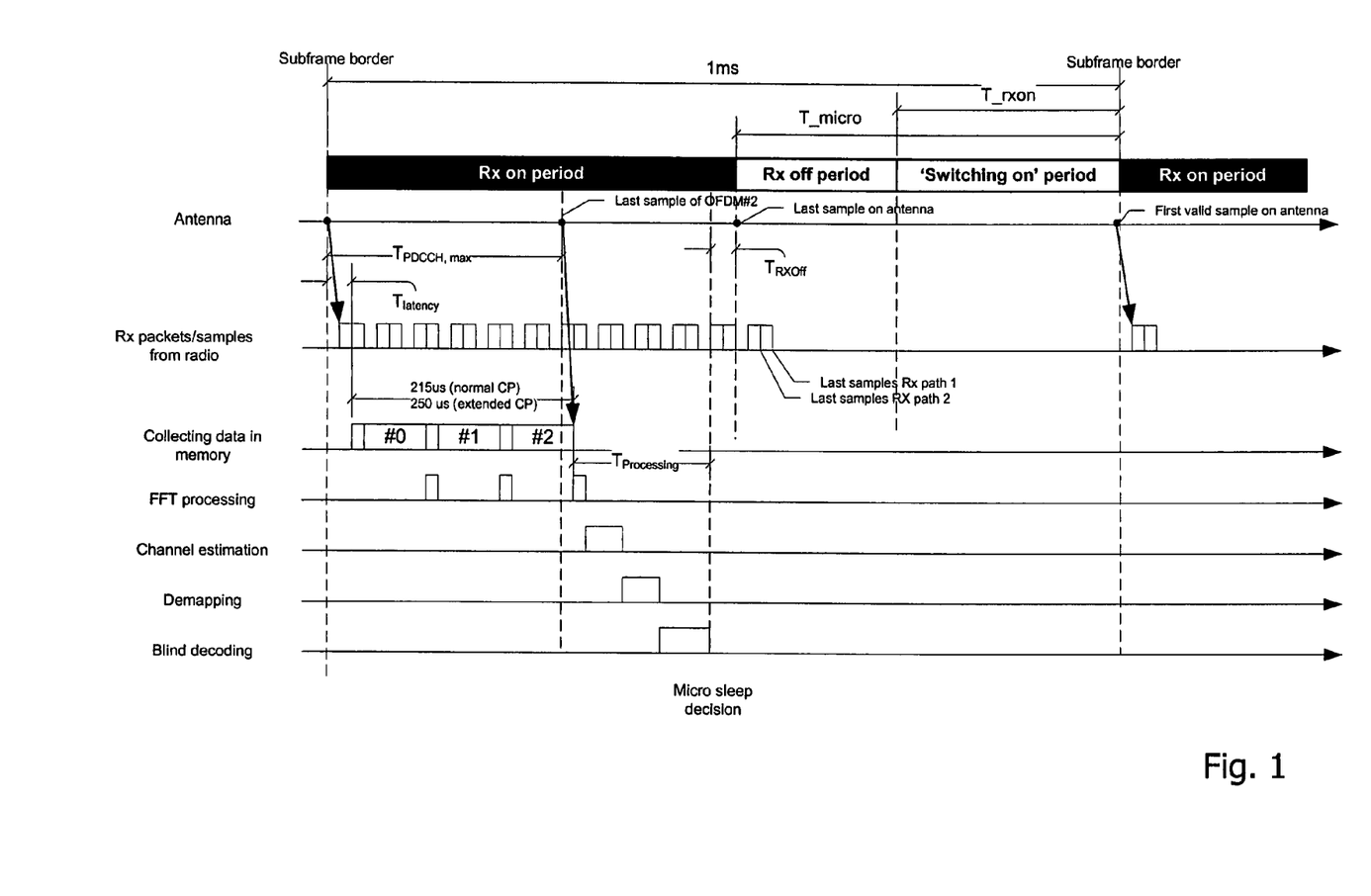
FIG. 1 shows a schematic timing diagram illustrating an exemplary micro sleep behaviour in an LTE implementation.

FIG. 1 shows a schematic timing diagram illustrating the processes of entering and leaving a micro sleep mode in an exemplary LTE scenario in which the PDCCH is spread over 3 OFDM symbols. In a regular reception mode ("Rx on period" in FIG. 1), a down-converted Radio Frequency (RF) signal from an analog radio front end is analog-to digital converted at a given sampling rate. The resulting signal samples are buffered in a memory for being subjected in blocks to FFT processing. The FFT processing results in a de-modulation of the received OFDM symbols, including the OFDM symbols that pertain to the PDCCH. After OFDM de-modulation, channel estimation and de-mapping steps are performed.

In a further step, the PDCCH is decoded to determine whether the remainder of the sub-frame has to be received also (and whether the PDSCH has to be decoded), or whether the receiver can enter a micro sleep mode ("Rx off period" in FIG. 1), in which one or more receiver components are switched off. The time it takes to enter the micro sleep mode ("'Switching off' period") is typically rather short and therefore not illustrated in FIG. 1. On the other hand, the micro sleep mode has to be left early enough ("'Switching on' period" in FIG. 1) to ensure that the regular reception mode is entered again before the next sub-frame arrives.

In the micro sleep mode, it is desirable to entirely switch off the Radio Frequency (RF) part of the receiver. However, switching off the RF part also implies that the oscillator frequency and phase reference for down-conversion are lost (and need to be synchronized again when reception re-starts for the next sub-frame). Moreover, the sampling phase of the Analog-to-Digital Converter (ADC) is not necessarily maintained unchanged over the micro sleep gap. Hence, the phase of the received signal before and after the micro sleep gap will in general exhibit a discontinuity.

As a result of the phase discontinuity of the received signal, the corresponding equivalent baseband channel also exhibits a discontinuity. Therefore, channel estimation after the micro sleep gap cannot simply employ filtering of reference symbols (pilot symbols) before and after the micro sleep gap. Rather, channel estimation needs to start anew with filtering of only the reference symbols received after the micro sleep gap. As a consequence, channel estimation performance is degraded for the symbols (and sub-frames) immediately following a micro sleep gap.

The control channel (PDCCH) has to be received and decoded first after a micro sleep gap. However, due to the temporary degradation of the channel estimation performance after the micro sleep gap, the error rates for receiving control information (and possibly user data) substantially increase. To avoid the phase discontinuity and to thus combat the increased error rates, the oscillator with its Phase-Locked Loop (PLL) may remain switched on during in the micro sleep mode. However, such an approach significantly decreases the power savings in the micro sleep mode. In addition, many receiver configurations do not permit switching off only certain receiver components while maintaining frequency synchronization and keeping the PLL switched on.

It has been found that micro sleep concepts of the type discussed above help to reduce the power consumed by the receiver. It would nonetheless be desirable to achieve a significant reduction in receiver power consumption during the micro sleep mode while at the same time avoiding increased error rates immediately after the micro sleep mode has been left. In more general terms, it would be desirable to avoid the negative impact of the phase discontinuity on the channel estimation process.

SUMMARY

There is a need for an improved channel estimation technique. In particular, there is a need for a channel estimation technique that can cope with signal phase discontinuities.

According to one aspect, a method of performing channel estimation based on a received signal comprising a first signal part and a second signal part in the presence of an unknown phase discontinuity between the first signal part and the second signal part is provided. The method comprises providing a first channel parameter that is based on the first signal part, determining a second channel parameter based on the second signal part, estimating the phase discontinuity from the first channel parameter and the second channel parameter, updating the first channel parameter based on the estimated phase discontinuity, and determining a channel estimate based on the second signal part including performing channel estimation filtering using the updated first channel parameter as filter state information.

The first channel parameter and the second channel parameter may be identical or different parameters. At least one of the first channel parameter and the second channel parameter may be derived based on reference symbols included in the received signal. As an example, at least one of the first channel parameter and the second channel parameter may be a coarse channel estimate derived from a reference symbol received on a single frequency (e.g., a single sub-carrier). Alternatively, at least one of the first channel parameter and the second channel parameter may be a first stage channel estimate derived from reference symbols received on multiple frequencies (e.g., multiple sub-carriers). In the latter scenario, the first stage channel estimate may be derived using a filtering operation in a frequency direction (e.g., an averaging within one modulation symbol).

The phase discontinuity may be caused by various effects. As an example, the phase discontinuity may result from an intended or un-intended interruption of signal reception. The interruption may be caused by switching off one or more components of a receiver between receipt of the first signal part and receipt of the second signal part.

In one implementation, the first signal part and the second signal part are separated by a micro sleep gap (in which one or more receiver components may have been switched off). The duration of the micro sleep gap may generally be defined to be shorter than a radio frame duration and, in particular, to be shorter than a sub-frame duration. In an exemplary LTE scenario, the maximum duration of a micro sleep gap may thus be below 1 ms.

The first signal part may temporally precede the second signal part. Alternatively, the second signal part may temporally precede the first signal part. If, for example, a latency of channel estimation filtering is chosen longer than the period of time (e.g., the reception gap) between the first signal part and the second signal part, the technique presented herein can also be used to improve the channel estimates for the temporarily preceding signal part based on a channel parameter derived based on the later signal part.

The first channel parameter may be determined in various ways. According to a first variant, the first channel parameter is determined based on de-modulated (e.g., de-rotated) reference symbols included in the first signal part by filtering the de-modulated reference symbols included in the first signal part in a frequency direction (e.g., over multiple sub-carriers). The filtering operation may be performed within a single modulation symbol, such as a single OFDM symbol. According to another variant, the first channel parameter is determined by additionally subjecting the frequency-filtered de-modulated reference symbols to a second filtering operation in a time direction (e.g., over two or more successive modulation symbols). In the latter case, the first channel parameter can be interpreted as a regular channel estimate that has been generated based on filter state information, whereas in the first case the first channel parameter may be considered a first stage channel estimate that has been derived in a stateless manner (working with modulation symbol granularity).

In a similar manner as the first channel parameter, the second channel parameter may also be derived in numerous ways. As an example, the second channel parameter may be derived based on de-modulated reference symbols included in the second signal part. In one implementation, the second channel parameter is derived based solely on one or more de-modulated reference symbols transmitted on a single frequency or on a single sub-carrier of the second signal part. Alternatively, the second channel parameter may be derived by an additional filtering of the de-modulated reference symbols included in the second signal part over multiple frequencies or sub-carriers ("first stage channel estimation").

Also the channel estimate may be determined in various ways, such as by applying statefull channel estimation filtering to either the de-modulated reference symbols included in the second signal part or to the de-modulated reference symbols that have additionally been filtered in a frequency direction. The statefullness of the channel estimation filtering results from use of the updated first channel parameter as filter state information.

The phase discontinuity may be determined based on an estimation of parameters describing the phase discontinuity (i.e., based on a parameterization process). In this regard, the phase discontinuity may be described by two or more individual parameters. Moreover, the (parameterized) phase discontinuity may be determined based on a maximum likelihood estimation. Specifically, the parameters may comprise a first phase parameter indicative of a sample timing uncertainty and a second phase parameter indicative of a common phase rotation. In such an implementation, a joint two-dimensional estimation for the first phase parameter and the second phase parameter may be separated, or split, into a sequence of a first one-dimensional estimation and a second one-dimensional estimation. After the first one-dimensional estimation has numerically been solved, the second one-dimensional estimation can be determined based on the solved first one-dimensional estimation.

The approach discussed herein may still further comprise dynamically deciding whether channel estimation filtering in relation to the second signal part is to be based on the updated first channel parameter or, alternatively, whether channel state information for channel estimation filtering is to be freshly determined based on the second signal part. The decision may be based on one or more of the following parameters: Doppler bandwidth, Signal-to-Noise Ratio (SNR), minimum achievable error magnitude in the maximum likelihood estimation, number of available reference symbols, and micro sleep gap length.

The technique presented herein may be implemented in the form of hardware, in the form of software or as a combined software/hardware solution. As for a software aspect, a computer program product is provided comprising program code portions for performing the steps of any of the methods and method aspects presented herein when the computer program product is executed on a computing device. The computer program product may be stored on a computer-readable recording medium such as a permanent or a re-writable memory, CD-ROM, or DVD. The computer program product may also be provided for download via a communication network such as the Internet, a cellular communication network or a wireless or wired Local Area Network (LAN).

According to another aspect, a device for performing channel estimation based on a received signal comprising a first signal part and a second signal part in the presence of an unknown phase discontinuity between the first signal part and the second signal part is provided. The device comprises an interface adapted to provide a first channel parameter that is based on the first signal part, a determinator adapted to determine a second signal parameter based on the second signal part, a phase discontinuity estimator adapted to estimate the phase discontinuity from the first channel parameter and the second channel parameter, an updater adapted to update the first channel parameter based on the estimated phase discontinuity, and a channel estimator adapted to determine a channel estimate based on the second signal part including performing channel estimation filtering using the updated first channel parameter as filter state information.

The device may be part of an OFDM receiver. This OFDM receiver may further comprise a controller adapted to switch off (and on) one or more receiver components during a micro sleep gap. Moreover, the OFDM receiver may conform to the LTE standard.

Also provided is a mobile terminal comprising a transceiver, wherein the transceiver includes the receiver presented herein. The mobile terminal may take the form of a mobile telephone, a smartphone, a network or data card, a notebook, and so on. Moreover, the mobile terminal may be configured to operate according to the LTE standard.

BRIEF DESCRIPTION OF THE DRAWINGS

In the following, the technique presented herein will be described in more detail with reference to exemplary embodiments illustrated in the drawings, wherein.

DETAILED DESCRIPTION

In the following description, for purposes of explanation and not limitation, specific details are set forth, such as specific receiver configurations and specific signalling scenarios, in order to provide a thorough understanding of the technique presented herein. It will be apparent to one skilled in the art that the technique may be practised in other embodiments that depart from these specific details. For example, while the following embodiments will primarily be described with reference to the LTE standard, it will be readily apparent that the technique can also be implemented in connection with other wireless or wired communication standards. Moreover, while the following embodiments are based on an interruption of a receiver operation that is caused by an intended micro sleep gap, it will be understood that the phase discontinuity may also be the result of other effects during signal reception. For example, the technique presented herein may also be applied when one ore more receiver components are switched off or non-operative for other reasons. As an example, the phase discontinuity may be caused by the fact that one or more symbols in Multimedia Broadcast over a Single Frequency Network (MBSFN) sub-frames are not received.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the technique presented herein may also be embodied in a computer processor and a memory coupled to the processor, wherein the memory stores one or more programs that perform the steps discussed herein when executed by the processor.

Figure 2:
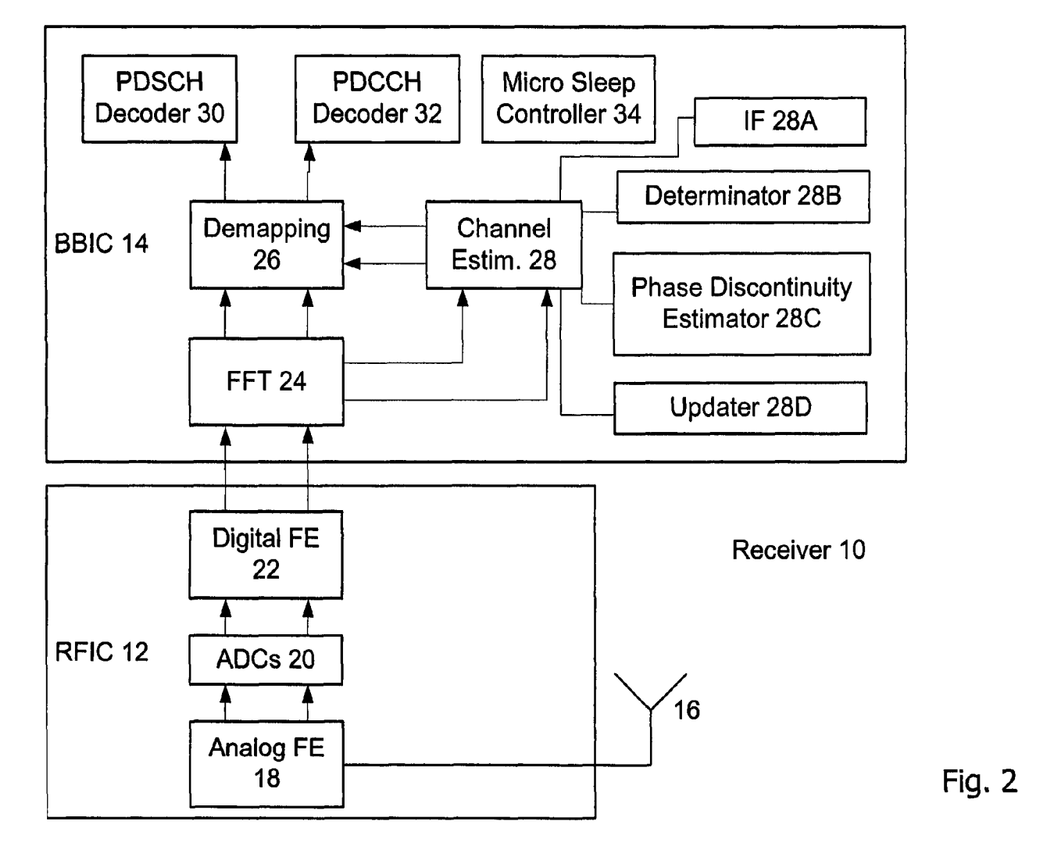
FIG. 2 shows a schematic block chart illustrating a receiver embodiment.

Reference is now made to FIG. 2, which shows an embodiment of a receiver 10 that conforms to the LTE standard. The receiver 10 may belong to a transceiver stage of a mobile terminal (UE) such as a mobile telephone.

As illustrated in FIG. 2, the receiver 10 comprises two separate Integrated Circuits (ICs), or chips. Specifically, the receiver 10 comprises a Radio Frequency (RF) IC 12 and a Base Band (BB) IC 14. The RFIC 12 communicates with the BBIC 14 via a digital interface. It should be noted that the receiver 10 could also be realized in a single chip implementation.

The RFIC 12 is configured to receive, via an air interface, an analog signal carrying the PDCCH and the PDSCH. This signal is received from a base station (also called eNodeB) via one or more antennas 16 coupled to the RFIC 12. As has been explained above with reference to FIG. 1, the PDCCH is transported in a first sub-frame portion, and the PDSCH is (potentially) transported in a second sub-frame portion of a sub-frame transmitted by the eNodeB.

As shown in FIG. 2, the RFIC 12 comprises an analog radio front end 18 including one or more low-noise amplifiers coupled to one or more antennas 16, one or more filter stages, one or more mixer stages, and one or more Local Oscillators (LOs). The RFIC 12 further comprises one or more ADCs 20 coupled between the analog radio front end 18 on the one hand and a Digital Front End (DFE) 22 on the other. The DFE 22 comprises one or more filters and one or more down sampling stages.

The DFE 22 of the RFIC 12 is coupled to a FFT block 24 of the BBIC 14 provided for OFDM de-modulation. Although not specifically illustrated in FIG. 2, a buffer memory is coupled between the DFE 22 and the FFT block 25 to temporarily store signal samples that will be subjected blockwise to the FFT operation carried out by the FFT block 24. The output of the FFT block 24 is fed in parallel to a demapper 26 and a channel estimator 28 of the BBIC 14.

As illustrated in FIG. 2, the estimator 28 comprises an interface 28A (e.g., to a buffer memory) to provide channel parameters, a determinator 28B to determine channel parameters, a phase discontinuity estimator 28C to estimate a phase discontinuity based on the channel parameters, and an updater 28D to update channel parameters based on the estimated phase discontinuity. The channel estimator 28 is adapted to determine a channel estimate based on statefull channel estimation filtering. Channel estimation filtering is performed to reduce noise and interference components in the received signal.

The demapper 26 performs its demapping operation based on the channel estimates received from the channel estimator 28. The output of the demapper 26 is fed to a PDSCH decoder 30 as well as to a PDCCH decoder 32. The PDCCH decoder 32 is configured to decode the PDCCH included in the first portion of a received sub-frame, whereas the PDSCH is configured to decode the PDSCH (potentially) included in the second portion of this sub-frame.

The BBIC 14 illustrated in FIG. 2 further comprises a micro sleep controller 34 adapted to switch off (and on) individual receiver components (such as the analog front end 18 and the ADCs 20) when the decoding of the PDCCH indicates that there will be no relevant PDSCH transmission in the sub-frame. An exemplary switching behaviour of the micro sleep controller 34 has been discussed above with reference to FIG. 1.

The RF signal received by the receiver 10 before the micro sleep gap (first signal part) can be described as a bandpass signal $x_{RF}(t)$ with center frequency $w_0$ in accordance with $$x_{RF}(t) = \sqrt{2}\, \Re\, e\{x(t)\exp(jw_0 t)\},$$

where Re{.} corresponds to the real part of a complex valued argument, $j=\sqrt{-1}$, and $x(t)$ corresponds to the equivalent complex valued baseband signal or complex envelope.

The RF signal after the micro sleep gap (second signal part) with phase discontinuity can then be formulated as $$x_{RF}(t) = \sqrt{2}\, \Re e\{x(t+\Delta t)\exp(j((w_0+\Delta w_0)(t+\Delta t)+\delta))\}$$
$$= \sqrt{2}\, \Re e\{\exp(j\Delta w_0 \Delta t + j\delta)\exp(j\Delta w_0 t)x(t+\Delta t)\exp(jw_0(t+\Delta t))\}$$

The errors $\Delta t$, $\Delta w_0$ and $\delta$ describe all effects from the phase discontinuity due to a micro sleep gap. $\Delta t$ corresponds to the sampling phase error, $\Delta w_0$ corresponds to a residual oscillator frequency error after micro sleep and/or after possible re-synchronization, and $\delta$ corresponds to an arbitrary phase difference of the LO used in the down-conversion.

From comparing the above two equations, one can identify the following effects of a phase discontinuity on the equivalent complex baseband signal:
1) Sampling phase is changed: $x(t) \rightarrow x(t+\Delta t)$
2) Effective channel is changed: $h(t) \rightarrow h(t)\cdot\exp(j\Delta w_0 \Delta t + j\delta)\exp(j\Delta w_0 t)$ For some implementations of the receiver 10, $\Delta t \approx 0$ can be assumed, which also simplifies the estimation of the phase discontinuity. However, it is not necessary that $\Delta t \approx 0$.

The signal properties derived above are valid for all transmission schemes and a variety of communication standards. The following description provides channel estimation details for the LTE receiver 10 as illustrated in FIG. 2, but it should be understood that the technique presented herein can also be applied in other wireless or wired standards.

As has been explained above, the phase discontinuity between the first signal part and the second signal part (which are separated by the micro sleep gap having a duration of $T_{micro}$ as illustrated in FIG. 1) deteriorates the channel estimation process performed by the channel estimator 28. It will now be explained how such a deterioration can be avoided (i.e., how phase continuity can be restored).

The following description exemplarily assumes LTE downlink OFDM signal transmission with $N_{RB}^{DL}$ resource blocks, each consisting of 12 resource elements on the frequency axis, sample duration T, FFT size $N>12N_{RB}^{DL}$, and $N_s \geq N$ samples as mutual distance between consecutive OFDM symbols on the time axis.

The normalized residual carrier frequency offset is defined as $$\xi_f = \Delta f T = \Delta w_0 T/(2\pi)$$

and the normalized time-domain sampling time offset is defined as $$\xi_t = \Delta t/T.$$

If $\xi_f$ is so small that inter-sub-carrier interference components are dominated by receiver noise and interference $N_{k,l}$ and only phase rotation needs to be considered, the frequency-domain transmission characteristic is obtained as follows $$Y_{k,l} = e^{j(2\pi\xi_f(N_s l+\xi_t)+\delta)} e^{j(2\pi/N)\xi_t f(k)} H_k A_{k,l} + N_{k,l}$$

for the complex-valued amplitudes $A_{k,l}$ generated at a transmitter side for resource-element index $k \in \{0, 1, \ldots, 12N_{RB}^{DL}-1\}$ in OFDM symbol with integer index l and transmitted over a channel with transfer function $H_k$ effective for resource-element index k. The natural frequency index $$f(k) = \begin{cases} k - 6N_{RB}^{DL}, & 0 \leq k < 6N_{RB}^{DL} \\ k - 6N_{RB}^{DL} + 1, & 6N_{RB}^{DL} \leq k < 12N_{RB}^{DL} \end{cases}$$

depends on resource-element index k in a widely linear fashion, but takes a jump due to the missing DC sub-carrier (i.e., the one at physical frequency 0) into account. The phase rotation factors are experienced by the receiver 10 like a phase-rotated effective channel and become undistinguishable part of the channel estimate in the receiver 10.

Assuming an interrupted signal reception as illustrated in FIG. 1 such that received OFDM symbols before and after the micro sleep gap correspond to a distance of L OFDM symbols and denoting normalized sampling time and phase offsets before and after the micro sleep gap by $\xi_t$, $\delta$, $\xi_t^a$, and $\delta^a$, respectively, one can write for the situation after the micro sleep gap $$Y_{k,l+L} = e^{j(2\pi\xi_f(N_s(l+L)+\xi_t^a)+\delta^a)} e^{j(2\pi/N)\xi_t^a f(k)} H_k A_{k,l+L} + N_{k,l+L}.$$

The resumption of receiver operation after the micro sleep gap can therefore be parameterized by an unknown common carrier-phase rotation $-\pi \leq \phi < \pi$ (to account for common phase rotation $e^{j(2\pi\xi_f(N_s L+\xi_t^a-\xi_t)+\delta^a-\delta)} = e^{j\phi}$) and a normalized sample timing uncertainty $\tau$ (to account for resource-element dependent phase rotation $e^{j(2\pi/N)(\xi_t^a-\xi_t)f(k)} = e^{j\tau f(k)}$), both factors giving rise to the phase discontinuity that degrades the channel estimation performance. The phase and the sample timing error parameters are both relative to the situation before the micro sleep gap. It is assumed that the same total receiver gain setting as before the micro sleep gap is restored after the micro sleep gap.

Figure 3:
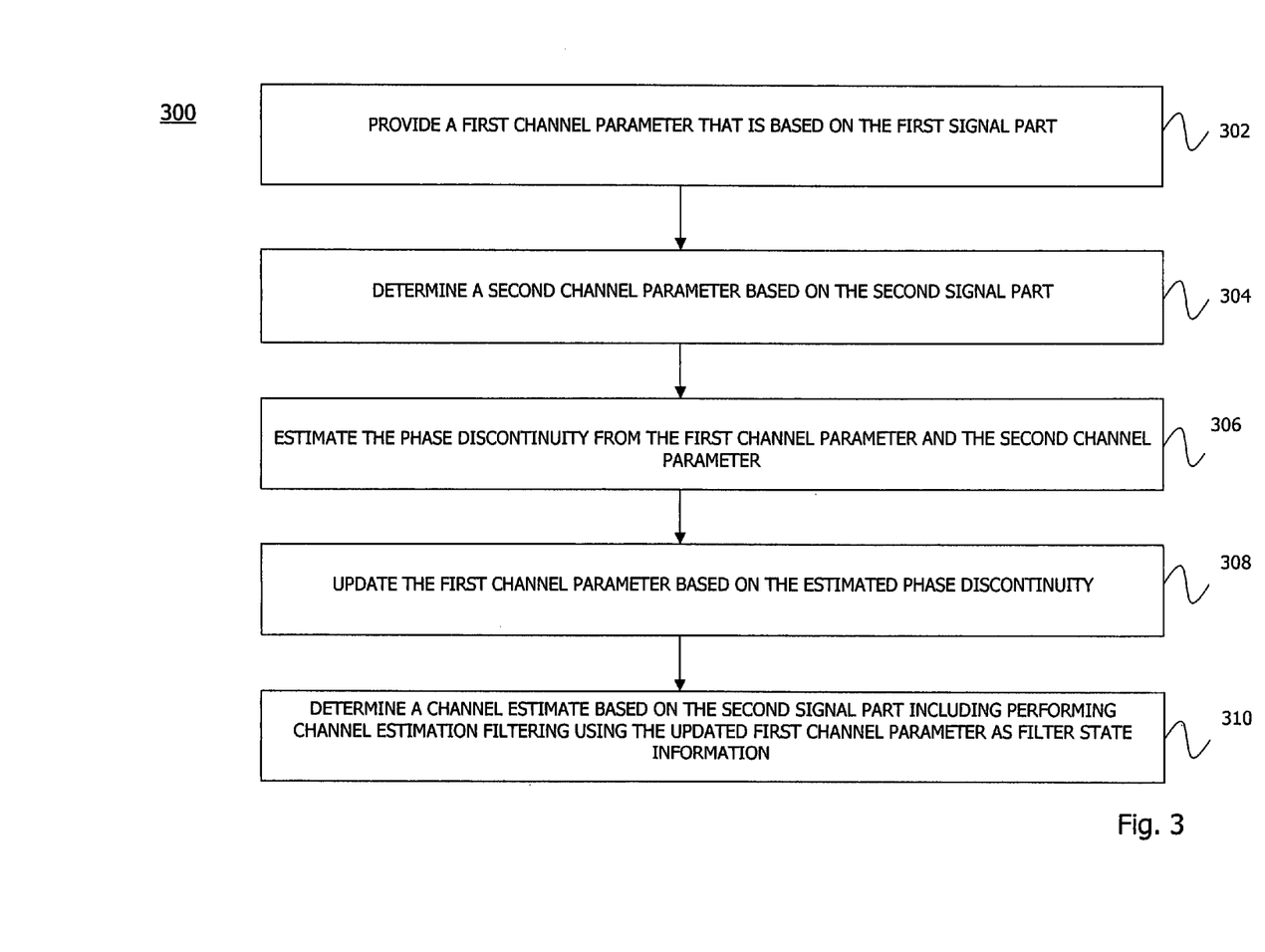
FIG. 3 shows a schematic diagram illustrating a first method embodiment.
Figure 4:
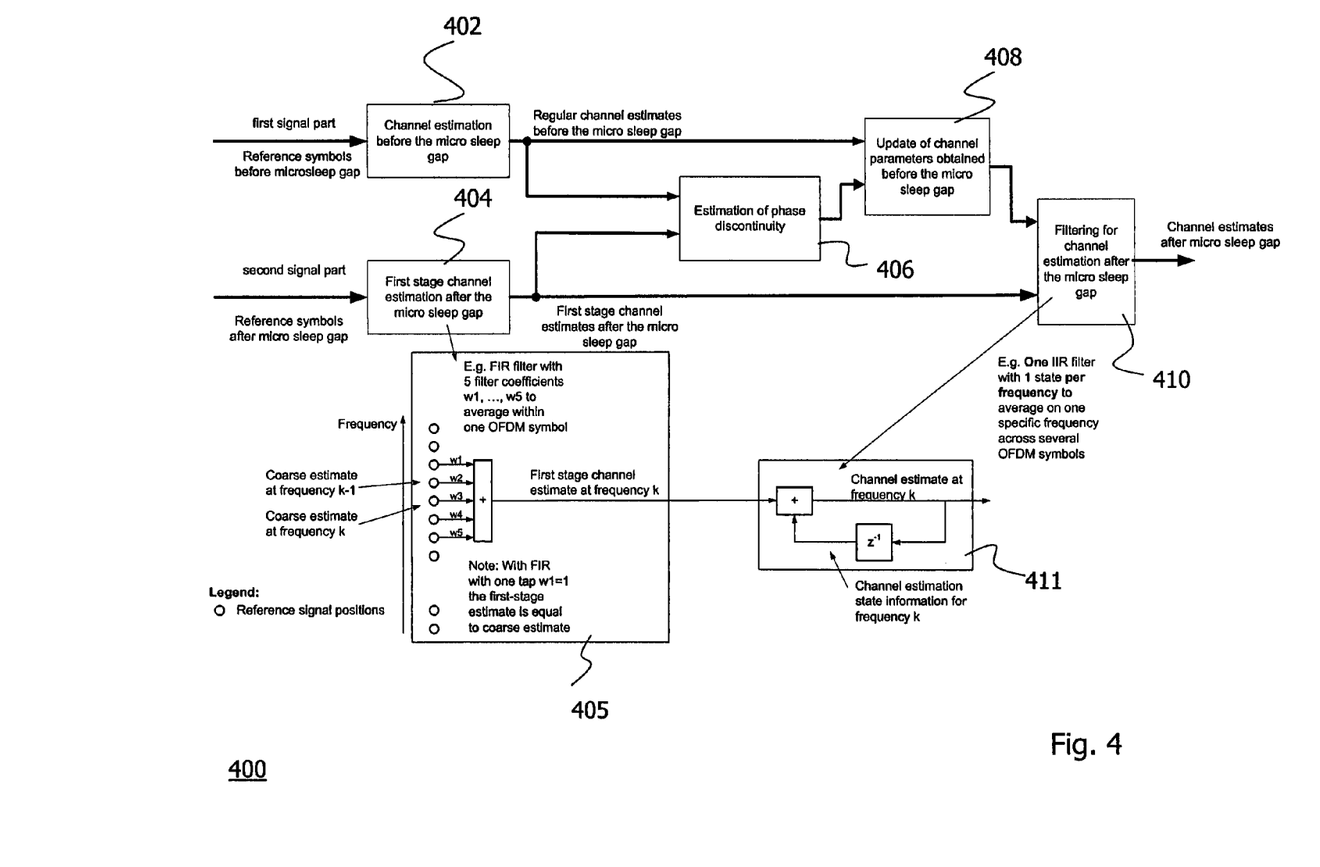
FIG. 4 shows a schematic diagram illustrating a first signal flow embodiment.

The operation of the LTE receiver 10 with respect to restoring phase continuity will now be described in more detail with reference to the flow chart 300 of FIG. 3 and the schematic diagrams 400 and 500 of FIG. 4 and FIG. 5. The flow chart 300 illustrates a method embodiment for channel estimation. The schematic diagram 400 of FIG. 4 illustrates a first signal flow embodiment for the channel estimation process. A second signal flow embodiment for the channel estimation process is illustrated in the schematic diagram 500 of FIG. 5.

In a first step 302, a first channel parameter that is based on reference symbols included in the first signal part (received before the micro sleep gap) is provided. As becomes apparent from boxes 402 and 502 in FIGS. 4 and 5, respectively, in the present embodiment the first channel parameter is a regular channel estimate derived by stateful channel estimation filtering. In another embodiment, the first channel parameter could be a first stage channel estimate derived in a stateless manner.

In a second step 304, a second channel parameter is determined based on reference symbols included in the second signal part. As becomes apparent from boxes 404 and 504 of FIGS. 4 and 5, respectively, the second channel parameter is a first stage channel estimate of lower precision than a regular channel estimate. In another embodiment, the second channel parameter could be a coarse channel estimate.

In the following, the calculation of coarse, first stage and regular channel estimates will briefly be explained with reference to the insert 405 of FIG. 4.

A coarse channel estimate is determined by de-modulating (i.e., de-rotating in the present embodiment) a reference symbol for a specific sub-carrier of a set of sub-carriers on which one OFDM symbol comprising the reference symbol is transmitted. In the insert 405, the sub-carriers are denoted by frequency indices k, k−1 and so on. A first stage channel estimate is determined by filtering multiple de-modulated reference symbols in a frequency direction using, for example, a Finite Impulse Response (FIR) filter. In the example illustrated in the insert 405, an FIR filter with 5 filter coefficients w1 to w5 is exemplarily illustrated. The filtering in the frequency domain direction performs an averaging of reference symbols transmitted within one OFDM symbol and delivers one first stage channel estimate for each sub-carrier with frequency index k, k−1, and so on. As illustrated in FIG. 4, the first stage channel estimate corresponds to a coarse channel estimate in case a single tap FIR filter is used.

The regular channel estimates are derived by additionally filtering first stage channel estimates in the time direction (assuming a temporal granularity of one OFDM symbol). While the filtering in the frequency direction only makes use of signal properties within one OFDM symbol (and can therefore be considered stateless), the filtering in the time direction is based on filter state information that has been calculated based on reference symbols received in earlier (and/or later) OFDM symbols. The filtering in the time direction may utilize an Infinite Impulse Response (IIR) filter with one state per sub-carrier to average on one specific frequency across two or more OFDM symbols.

The coarse, first stage and regular channel estimates may be determined by the determinator 28B of the channel estimator 28 (see FIG. 2). The determinator 28B is configured to temporarily store, via the memory interface 28A, the regular channel estimates (or, alternatively, the first stage channel estimates) determined for the first signal part in a buffer until the first stage channel estimates (or, alternatively, the coarse channel estimates) for the second signal part have become available after the micro sleep gap.

Once the channel estimates for the second signal part have become available, the channel estimates for the first signal part are retrieved again, via the memory interface 28A, from the buffer. Then, the channel estimates for the second signal part are fed together with the channel estimates for the first signal part to the phase discontinuity estimator 28C. The phase discontinuity estimator 28C estimates, in step 306, the phase discontinuity based on the channel estimates thus received (boxes 406 and 506 in FIGS. 4 and 5, respectively). This estimation process will now be described in more detail.

The coarse or first stage channel estimate (i.e., possibly frequency-direction filtered) for frequency-domain resource-element index $k \in K_{RSIG} \subset \{0, 1, \ldots, 12N_{RB}^{DL}-1\}$ after the micro sleep gap is denoted as $\tilde{H}_k$ and the last available (at least frequency direction and possibly also time direction filtered) channel estimate before the micro sleep gap is denoted as $\hat{H}_k$. The ordered set $K_{RSIG}$ contains all resource element indices which carry reference signal data in the first relevant OFDM symbol after the micro sleep gap, i.e., the mutual distance between indices is 6. For convenient mathematical treatment, the individual channel estimates are collected in the vectors $\underline{\tilde{H}}=[\tilde{H}_k]_{k \in K_{RSIG}}$ and $\underline{\hat{H}}=[\hat{H}_k]_{k \in K_{RSIG}}$.

A maximum-likelihood (ML) estimation is performed in step 306 for the two unknown parameters, which reads $$[\hat{\varphi}, \hat{\tau}] = \underset{[\tilde{\varphi},\tilde{\tau}]}{\operatorname{argmin}} |\underline{\tilde{H}} - e^{j\tilde{\varphi}}\underline{T}(\tilde{\tau})\underline{\hat{H}}|^2,$$

where the diagonal rotation matrix is defined as $$\underline{T}(\tilde{\tau}) = \operatorname{diag}([e^{j\tilde{\tau}f(k)}]_{k \in K_{RSIG}}).$$

The ML expression can be reformulated as $$[\hat{\varphi}, \hat{\tau}] = \underset{[\tilde{\varphi},\tilde{\tau}]}{\operatorname{argmax}} \operatorname{Re}\{\underline{\hat{H}}^H \underline{T}^H(\tilde{\tau}) \underline{\tilde{H}} e^{-j\tilde{\varphi}}\}.$$

It is important to realize that the expression for a joint two-dimensional estimation can be separated without loss into a sequence of two independent one-dimensional estimations. The sequence of optimum estimators reads as follows $$\hat{\tau} = \underset{\tilde{\tau}}{\operatorname{argmax}} |\underline{\hat{H}}^H \underline{T}^H(\tilde{\tau}) \underline{\tilde{H}}| = \underset{\tilde{\tau}}{\operatorname{argmax}} \left| \sum_{k \in K_{RSIG}} \hat{H}_k^* \tilde{H}_k e^{-j\tilde{\tau}f(k)} \right|$$

$$\hat{\varphi} = \arg(\underline{\hat{H}}^H \underline{T}^H(\hat{\tau}) \underline{\tilde{H}}) = \arg\left( \sum_{k \in K_{RSIG}} \hat{H}_k^* \tilde{H}_k e^{-j\hat{\tau}f(k)} \right).$$

Introducing the resource element-wise correlation $C_k = \hat{H}_k^* \tilde{H}_k$ and associated vector $\underline{C}=[C_k]_{k \in K_{RSIG}}$ and the "phase-ramp" vector $\underline{t}(\tilde{\tau})=[e^{j\tilde{\tau}f(k)}]_{k \in K_{RSIG}}$ ($\underline{T}(\tilde{\tau})=\operatorname{diag}(\underline{t}(\tilde{\tau}))$), the above equations can be re-written in the compact form $$\hat{\tau} = \underset{\tilde{\tau}}{\operatorname{argmax}} |\underline{t}^H(\tilde{\tau})\underline{C}|$$

$$\hat{\varphi} = \arg(\underline{t}^H(\hat{\tau})\underline{C}) = \left( \sum_{k \in K_{RSIG}} C_k e^{-j\hat{\tau}f(k)} \right),$$

which makes it apparent that the phase continuity restoration problem has been reformulated to an expression which typically appears in array processing or spectral estimation. This means that numerical solutions for the estimation problem can be found.

The estimation to obtain $\hat{\tau}$ can be implemented according to existing literature and is not restricted to one of the following examples:

If τ is completely unknown (i.e., the most general case)
1) by searching the maximum magnitude in the spectrum of the appropriately padded resource element wise correlation vector $\underline{C}$.
2) by a number of computationally efficient state-of-the art algorithms based on simple frequency-direction lag-m correlations of the type $R_m = \Sigma_k w_k C_{k-m}^* C_k$ with m≥1 and any possible weighting function $w_k$.

The estimator 28C may use one or more of those correlation results and combine them in any suitable fashion to still achieve close-to-optimum performance, when compared to an optimum spectrum estimator.

If τ is known to be from a small set of discrete values by explicitly computing the metric for each of the few possible hypotheses, which is still optimum as long as τ does not violate the discrete-set assumption.

Having estimated $[\hat{\phi}, \hat{\tau}]$ in step 306, the channel estimates $\underline{\hat{H}}$ for the first signal part are updated (or "corrected") in a subsequent step 308 (see boxes 408 and 508 in FIGS. 4 and 5, respectively) by performing $\underline{\hat{H}}' = e^{j\hat{\phi}} \underline{T}(\hat{\tau}) \underline{\hat{H}}$ to restore virtual phase continuity.

Figure 5:
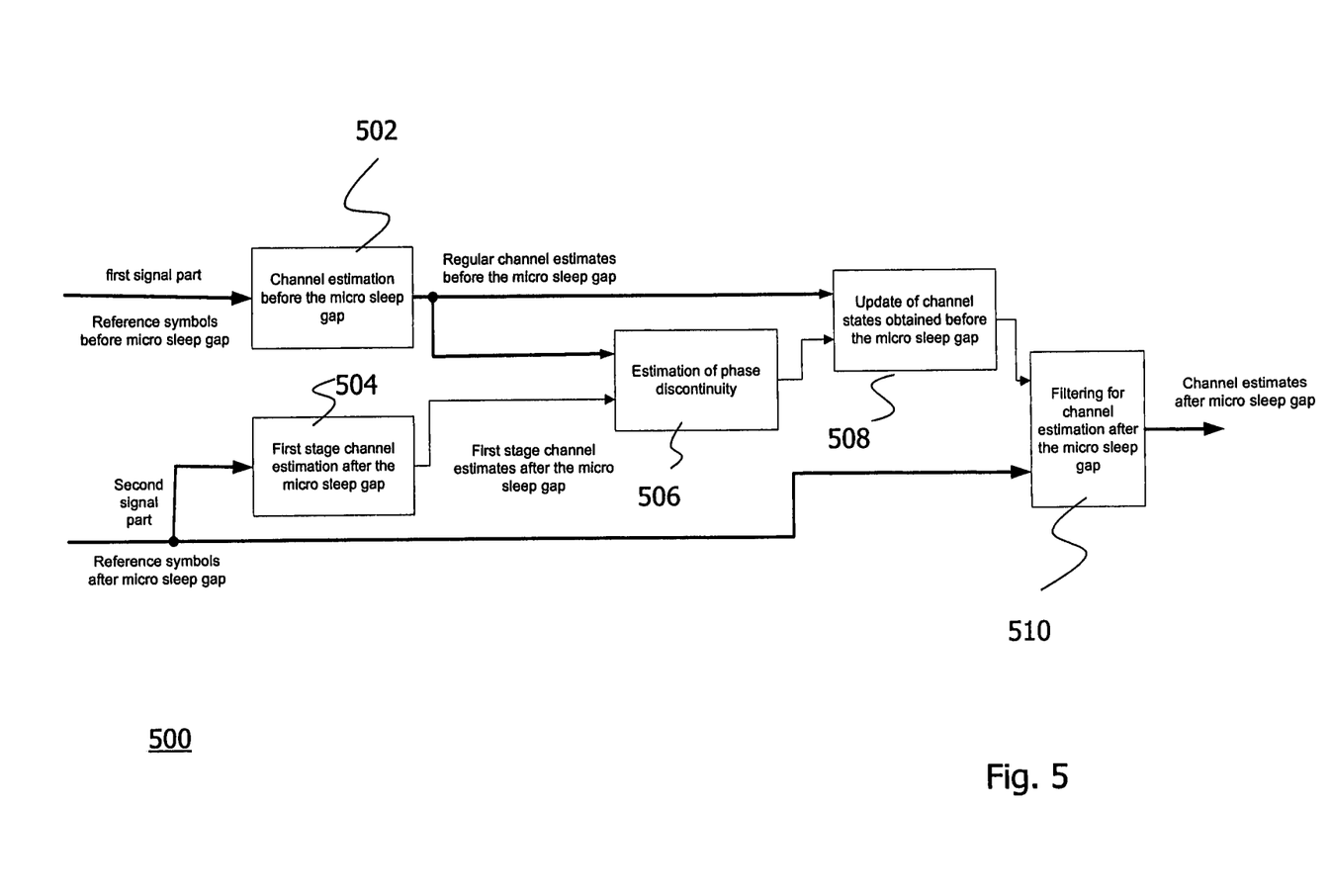
FIG. 5 shows a schematic flow chart illustrating a second signal flow embodiment.

Then, in a further step 310, a "regular" channel estimate for the second signal part is determined based on stateful channel estimation filtering (see boxes 410 and 510 in FIGS. 4 and 5, respectively). Channel estimation filtering in step 310 is performed in a similar manner as discussed above with respect to step 302 as well as the boxes 402 and 502 in FIGS. 4 and 5, respectively. As has already been explained, channel estimation filtering may exemplarily be based on an IRR filter as generally illustrated in insert 411 of FIG. 4. Channel estimation filtering is thus performed in a recursive manner, while the frequency-direction filtering illustrated in insert 405 is performed in a non-recursive (i.e., in a stateless) manner.

$\underline{\hat{H}}'$ shall only be used as filter-state variable for stateful channel estimation filtering with the most recent first-stage channel estimates $\underline{\hat{H}}$ (as derived for the second signal part) in case that a quality measure based on $|\underline{\hat{H}} - \underline{\hat{H}}'''|^2$ compared against a noise estimate indicates that phase restoration was successful. This metric further indicates that channel variation due to Doppler was within an acceptable limit so that restoration of phase continuity makes sense as will be explained with reference to FIG. 6 below.

The main difference between the signal flow embodiments of FIGS. 4 and 5 pertains to the fact that the channel estimation filtering according to box 410 of FIG. 4 is applied to the first stage channel estimates, whereas the channel estimation filtering according to box 510 of FIG. 5 is applied to the (de-modulated) reference symbols (i.e., to the coarse channel estimates). Typically, one would choose the approach illustrated in FIG. 4 in case channel estimation filtering consists of a part that is independent of the reference symbols before the micro sleep gap anyway (e.g., frequency direction filtering in OFDM-based systems), because the first stage of the channel estimation after the micro sleep gap is used regardless of the presence of micro sleep gaps. In particular, when splitting channel estimation filtering for OFDM-based systems into two parts, i.e. filtering in frequency direction followed by filtering in time direction, the filtering in frequency direction can be performed irrespective of any phase discontinuities due to micro sleep (since it estimates the channel based on the reference symbol in a single OFDM symbol only).

In certain channel scenarios, a reliable estimation of the phase discontinuity over a micro sleep gap might not be possible. As an example, for high Doppler bandwidth and long micro sleep gaps, the channel may change too much over the duration $T_{micro}$ of the micro sleep gap, so that phase discontinuity estimation becomes unreliable or even impossible. This problem may be aggravated in case of a low SNR operating point and availability of only a few reference symbols (which might be the case for smaller bandwidth systems). For high Doppler bandwidth and long micro sleep gaps, channel estimation filters would become rather short in the time direction. As a result, the technique presented herein might not significantly improve channel estimation performance.

Figure 6:
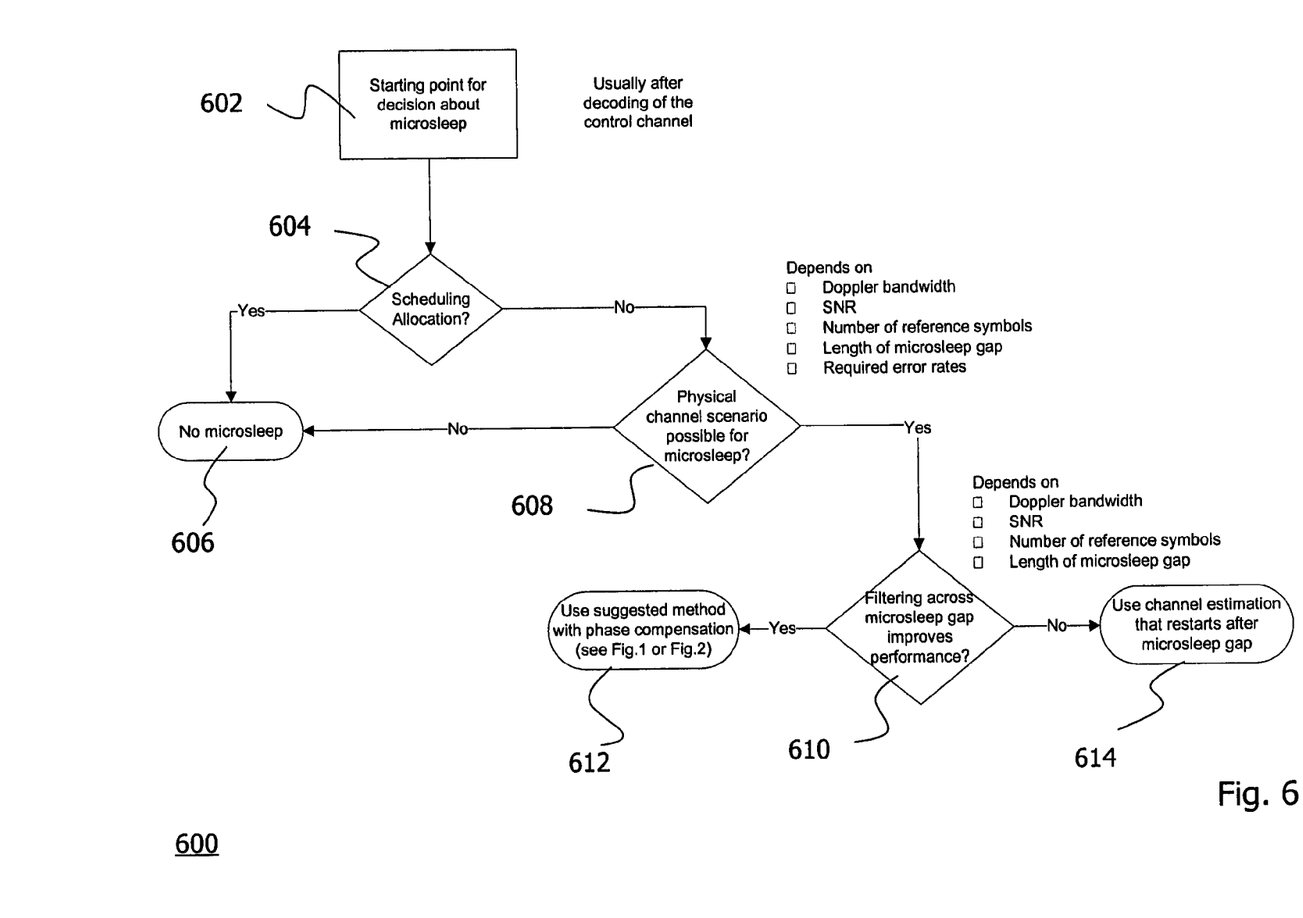
FIG. 6 shows a second method embodiment illustrating a selective phase continuity restoration approach.

Accordingly, to avoid error bursts after micro sleep gaps due to erroneous phase estimation, the phase continuity restoration technique presented herein (and the micro sleep strategy) may be made dependent on additional criteria as generally shown in FIG. 6. FIG. 6 illustrates a method embodiment for dynamically deciding whether or not to enter the micro sleep mode and whether or not to apply the phase continuity restoration technique presented herein.

In an initial step 602, the micro sleep controller 34 starts to operate once the decoding result of the PDCCH decoder 32 becomes available. The micro sleep controller 34 then determines in step 604 whether the decoding result is indicative of a dedicated PDSCH scheduling allocation in the remainder of the sub-frame carrying the PDCCH. Should a PDSCH transmission be scheduled, the micro sleep controller 34 makes a decision against the micro sleep mode (step 606). Otherwise, the micro sleep controller 34 determines in step 608 whether the current physical channel scenario permits entering the micro sleep mode. The decision in step 608 may depend on one or more of the Doppler bandwidth, the SNR, the number of reference symbols available, the potential length of the micro sleep gap as well as the required error rates.

In the case the physical channel scenario does not permit to enter the micro sleep mode, the method branches to step 606. Otherwise, the method branches to step 610 in which it is determined whether or not phase continuity restoration techniques are to be applied. The decision in step 610 may depend on one or more of the Doppler bandwidth, SNR, number of available reference symbols, the potential length of the micro sleep gap, and the minimum achievable error magnitude in the ML estimation.

In the case no performance increases are expected from phase continuity restoration, the method branches to step 614, in which the channel state information for channel estimation filtering in step 310 will be freshly determined based on the second signal part received after the micro sleep gap. This approach corresponds to a stateless re-start of the channel estimation process after the micro sleep gap. If, on the other hand, it is determined in step 610 that performance increases can be expected, the method branches to step 612 and performs phase continuity restoration in accordance with one of the approaches sketched in FIGS. 4 and 5.

As has become apparent from the above description of exemplary embodiments, the technique presented herein reduces transmission losses due to channel estimation errors after a micro sleep gap or similar intended or unintended interruption of the receiver operation. As a result, the receiver performance can be improved in micro sleep and other scenarios. Additionally, due to the improved channel estimation, the micro sleep mode can be entered more frequently without failing compliance tests. Consequently, the power savings from the micro sleep mode will be increased. In particular, phase continuity can be restored without the need of maintaining phase continuity in the RF receiver part. Hence, the RF receiver part can be switched off completely, which further increases the power savings from employing the micro sleep mode.

In the foregoing, principles, embodiments and various modes of implementing the technique presented herein have exemplarily been described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method of performing channel estimation based on a received signal comprising a first signal part and a second signal part in the presence of a micro sleep gap between the first signal part and the second signal part, wherein the micro sleep gap results in an unknown phase discontinuity, the method comprising:
- providing a first channel parameter that is based on the first signal part;
- determining a second channel parameter based on the second signal part;
- estimating the phase discontinuity from the first channel parameter and the second channel parameter;
- updating the first channel parameter based on the estimated phase discontinuity;
- determining a channel estimate based on the second signal part including performing channel estimation filtering using the updated first channel parameter as filter state information.

2. The method of claim 1, wherein the phase discontinuity is caused by switching off one or more components of a receiver between receipt of the first signal part and receipt of the second signal part.

3. The method of claim 1, wherein the first signal part temporally precedes the second signal part.

4. The method of claim 1:
- wherein the first signal part includes reference symbols;
- further comprising:
  - de-modulating the reference symbols included in the first signal part;
  - filtering the de-modulated reference symbols included in the first signal part in a frequency direction to determine the first channel parameter.

5. The method of claim 4, further comprising filtering the frequency-filtered de-modulated reference symbols in a time direction to determine the first channel parameter.

6. The method of claim 1:
- wherein the second signal part includes reference symbols;
- further comprising de-modulating the reference symbols included in the second signal part;
- wherein the determining the second channel parameter comprises determining the second channel parameter based on one or more de-modulated reference symbols received on single frequency or sub-carrier.

7. The method of claim 1:
- wherein the second signal part includes reference symbols;
- further comprising de-modulating the reference symbols included in the second signal part;
- wherein the determining the second channel parameter comprises determining the second channel parameter based on de-modulated reference symbols received on multiple frequencies or sub-carriers.

8. The method of claim 1:
- wherein the second signal part includes reference symbols;
- further comprising de-modulating the reference symbols included in the second signal part;
- wherein the determining the channel estimate comprises determining the channel estimate by applying the channel estimation filtering to the de-modulated reference symbols.

9. The method of claim 1:
- wherein the second signal part includes reference symbols;
- further comprising:
  - de-modulating the reference symbols included in the second signal part;
  - filtering the de-modulated reference symbols included in the second signal part in a frequency direction;
- wherein the determining the channel estimate comprises determining the channel estimate by applying the channel estimation filtering to the frequency-filtered de-modulated reference symbols.

10. The method of claim 1, wherein the estimating the phase discontinuity comprises estimating parameters describing the phase discontinuity.

11. The method of claim 10, wherein the parameters comprise a first phase parameter indicative of a sample timing uncertainty and a second phase parameter indicative of a common phase rotation.

12. The method of claim 11, further comprising:
- separating a joint two-dimensional estimation for the first phase parameter and the second phase parameter into a sequence of a first one-dimensional estimation for the first phase parameter and a second one-dimensional estimation for the second phase parameter;
- numerically solving the first one-dimensional estimation;
- determining the second one-dimensional estimation based on the solved first one-dimensional estimation.

13. The method of claim 1, further comprising dynamically deciding whether channel estimation filtering in relation to the second signal part is to be based on the updated first channel parameter or whether channel state information for channel estimation filtering is to be freshly determined based on the second signal part.

14. The method of claim 13, wherein the dynamically deciding is based on one or more of the following parameters: Doppler bandwidth, Signal-to-Noise Ratio, minimum achievable error magnitude in the maximum likelihood estimation, number of available reference symbols, and micro sleep gap length.

15. A computer program product stored in a non-transitory computer readable medium for performing channel estimation based on a received signal comprising a first signal part and a second signal part in the presence of a micro sleep gap between the first signal part and the second signal part, wherein the micro sleep gap results in an unknown phase discontinuity, the computer program product comprising software instructions which, when run on a computing device, causes the computing device to:
- provide a first channel parameter that is based on the first signal part;
- determine a second channel parameter based on the second signal part;
- estimate the phase discontinuity from the first channel parameter and the second channel parameter;
- update the first channel parameter based on the estimated phase discontinuity;
- determine a channel estimate based on the second signal part including performing channel estimation filtering using the updated first channel parameter as filter state information.

16. A device for performing channel estimation based on a received signal comprising a first signal part and a second signal part in the presence of a micro sleep gap between the first signal part and the second signal part, wherein the micro sleep gap results in an unknown phase discontinuity, the device comprising:
- an interface configured to provide a first channel parameter that is based on the first signal part;
- a determinator configured to determine a second channel parameter based on the second signal part;
- a phase discontinuity estimator configured to estimate the phase discontinuity from the first channel parameter and the second channel parameter;
- an updater configured to update the first channel parameter based on the estimated phase discontinuity; and
- a channel estimator configured to determine a channel estimate based on the second signal part including performing channel estimation filtering using the updated first channel parameter as filter state information.

17. The device of claim 16, wherein in the device forms a portion of an Orthogonal Frequency Division Multiplexing (OFDM) receiver.

18. The device of claim 17, wherein the OFDM receiver comprises a controller adapted to switch off one or more receiver structures during a micro sleep gap.

\* \* \* \* \*